(12) United States Patent
Lerey

(10) Patent No.: US 9,330,498 B2
(45) Date of Patent: May 3, 2016

(54) PATH CONNECTING A FIRST POINT TO A SECOND POINT IN A THREE-DIMENSIONAL SCENE

(71) Applicant: Dassault Systemes, Velizy Villacoublay (FR)

(72) Inventor: Guillaume Lerey, Paris (FR)

(73) Assignee: Dassault Systemes, Velizy Villacoublay (FR)

( * ) Notice: Subject to any disclaimer, the term of this patent is extended or adjusted under 35 U.S.C. 154(b) by 0 days.

(21) Appl. No.: 14/336,771

(22) Filed: Jul. 21, 2014

(65) Prior Publication Data

US 2015/0029181 A1    Jan. 29, 2015

(30) Foreign Application Priority Data

Jul. 25, 2013   (EP) .................................... 13306081

(51) Int. Cl.
*G06T 19/00*    (2011.01)
*G06F 17/50*    (2006.01)

(52) U.S. Cl.
CPC ............ *G06T 19/003* (2013.01); *G06F 17/509* (2013.01); *G06F 17/5004* (2013.01); *G06F 2217/34* (2013.01); *G06F 2217/36* (2013.01); *G06T 2215/06* (2013.01)

(58) Field of Classification Search
CPC ............ G06F 17/5077; G06F 17/5072; G06F 17/509; G06F 2217/36; G06F 17/5004; G06F 17/50; G06F 17/5018; G06F 17/5036; G06F 17/5068; G06F 17/5081; G06F 2217/34; G06F 15/8053; G06F 17/505
See application file for complete search history.

(56) References Cited

U.S. PATENT DOCUMENTS

| | | | | |
|---|---|---|---|---|
| 5,452,468 A * | 9/1995 | Peterson | ........... | G06F 17/30958 345/419 |
| 5,982,374 A * | 11/1999 | Wahl | .............. | G06T 17/00 345/419 |
| 7,333,104 B2 * | 2/2008 | Kase | .............. | G06T 17/005 345/420 |
| 8,612,913 B1 * | 12/2013 | Peart | .................... | G06F 17/5031 703/19 |
| 2005/0268245 A1 * | 12/2005 | Gipps | ................. | G06F 17/5004 715/762 |
| 2006/0290695 A1 * | 12/2006 | Salomie | ................... | G06T 17/20 314/420 |
| 2007/0057938 A1 * | 3/2007 | Usami | ................. | G06F 17/5018 345/419 |
| 2009/0271156 A1 * | 10/2009 | Kageura | ............. | G06F 17/5018 703/1 |
| 2015/0088579 A1 * | 3/2015 | Gerphagnon | .......... | G06Q 10/04 705/7.23 |

FOREIGN PATENT DOCUMENTS

EP          13 30 6081          9/2010

OTHER PUBLICATIONS

European Search Report for EP 13 30 6081 dated Nov. 28, 2013.
Guirardello, R., et al. "Optimization of Process Plant Layout with Pipe Routing" Computers and Chemical Engineering 3:1, Nov. 15, 2005.
Zhu, D., et al. "Pipe Routing-Path Planning (with many constraints)", Proceedings of the International Conference on Robotics and Automation, pp. 1940-1947, Apr. 9, 1991.

* cited by examiner

*Primary Examiner* — Jeffrey Chow
(74) *Attorney, Agent, or Firm* — Hamilton, Brook, Smith & Reynolds, P.C.

(57) ABSTRACT

It is proposed a computer-implemented method, system and program product designing a path connecting a first point to a second point in a three-dimensional scene. The method comprises:
  providing the first point coupled with a first vector;
  providing the second point coupled with a second vector; and
  providing a set of paths by following at the most three portions of a parallelepiped, the parallelepiped comprising the provided first point on a first vertex and the provided second point on a second vertex, a portion of the parallelepiped being an edge, a diagonal of a face, a space diagonal.

20 Claims, 9 Drawing Sheets

PATH CONNECTING A FIRST POINT TO A SECOND POINT IN A THREE-DIMENSIONAL SCENE

RELATED APPLICATION(S)

This application claims priority under 35 U.S.C. §119 or 365 to Europe, Application No. 13306081.4, filed Jul. 25, 2013. The entire teachings of the above application(s) are incorporated herein by reference.

FIELD OF THE INVENTION

The invention relates to the field of computer programs and systems, and more specifically to a method, computer-aided system and computer program for designing a path connecting a first point to a second point in a three-dimensional scene.

BACKGROUND OF THE INVENTION

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In the context of CAD/CAE/CAM, designing a product can comprise designing a route between two points. Designing a route is typically performed for operations such as tubing to route tubes, piping to route Pipes, HVAC (Heating, Ventilation and Air-Conditioning) to route air ducts, electrical cable to route cables, raceway to route trays. The design of a route is typically done for industrial products such as cars, buildings, ships, airplanes, and these industrial products cause the designed route to be realistic. A route is typically a succession of straight portions connected with regular angles and standard bend radius because of the regular shapes of the industrial products. For instance, a building comprises walls that are typically connected each other with perpendicular angles. Walls are therefore constraints to be taken into accounts when designing air ducts route: for instance, the route will follow a path along the walls.

Some CAD systems include piping and tubing design capabilities, or plugins providing these capabilities may be installed on CAD software. However, the existing solutions suffer of several drawbacks. First, they do not help the designer to select the right path quickly with the right input. In particular, in the event the solution is only a line, the designer cannot check with right precision the clash with the context. In addition, it can take time for the designer to review all solutions because the solutions are show one by one. Moreover, impossible solutions are shown: an impossible solution is a solution that is not realistic. For instance, an air ducts route following three portions of a same wall is considered as being an impossible solution because such a solution is unrealistic in the real world.

Within this context, there is still a need for an improved method for designing a route connecting a first point to a second point in a three-dimensional scene.

SUMMARY OF THE INVENTION

According to one aspect, the invention therefore provides a computer-implemented method for designing a path connecting a first point to a second point in a three-dimensional scene, comprising:
  providing the first point coupled with a first vector;
  providing the second point coupled with a second vector;
  providing a set of paths by following at the most three portions of a parallelepiped, the parallelepiped comprising the provided first point on a first vertex and the provided second point on a second vertex, a portion of the parallelepiped being an edge, a diagonal of a face, a space diagonal.

The method may comprise one or more of the following:
  the first and second vertices are on opposite faces of the parallelepiped, the set of paths comprises one path comprising one portion made of the space diagonal connecting the first and second points, six paths comprising two portions having a common vertex of the parallelepiped, one portion being a diagonal of a face of the parallelepiped, the diagonal comprising the first or the second points, and one portion being an edge, six paths comprising three consecutive portions, each portion being an edge.
  the first and second vertices belong to a same face, the set of path comprises one path comprising one portion being a diagonal of the face the first and second vertices belong to, two paths comprising two consecutive portions, each portion being an edge.
  orienting the parallelepiped in the three-dimensional scene about one of the following orientation: one of the directions of the global orientation of the three-dimensional scene, a direction provided by the first vector, a direction provided by the second vector;
  providing a bend radius for connecting at least two portions of the path connecting the first and second points;
  after providing a bend radius: computing, for each path of the set, a parallelepiped that connects the first and the second points to the path in accordance with the bend radius;
  computing for each path of the set a parallelepiped comprises computing a new position of the first vertex and a new position of the second vertex by:
    computing a distance $D_1$ between the first point and the first vertex such that $D_1 = \text{Bend Radius} \times (\sin \alpha_1)$, wherein Bend Radius is the value of the provided bend radius, and $\alpha_1$ is the angle between the direction of the first vector and the portion of the path that is connected the first vertex;

computing a distance $D_2$ between the second point and the second vertex such that $D_2$=Bend Radius×(sin $\alpha_2$), wherein Bend Radius is the value of the provided bend radius, and $\alpha_2\alpha_2$ is the angle between the second vector and the portion of the path that is connected the second vertex;

computing the length (L) of each edge of the path, determining that the length (L) is such that L≥Bend Radius× (sin $\alpha_x$+sin $\alpha_y$) wherein Bend Radius is the value of the provided bend radius, $a_x$ is the value of the angle between the said each edge of the path and another portion of the path that share a first common vertex of the said each edge of the path or the value of the angle between the said each edge of the path and the direction of the first vector, and $\alpha_y\alpha_y$ is the value of the angle between the said each edge of the path and another portion of the path that share a second common vertex of said each edge of the path or the angle between the said each edge of the path and the direction of the second vector;

the one or more portions of the parallelepiped form a polyline connecting the first point to the second point;

providing the dimension of a section of an industrial product; forming a shape along the polyline, wherein the polyline is the center of the section;

providing the first point coupled with the first vector comprises placing a first three-dimensional object in the three-dimensional scene, the first vector orienting the three-dimensional object in the three-dimensional scene; and providing the second point coupled with the second vector comprises placing a second three-dimensional object in the three-dimensional scene, the second vector orienting the three-dimensional object in the three-dimensional scene;

displaying a preview of each paths of the provided set of paths; and emphasizing one of the previews to show the path connecting the first point to the second point.

The invention further proposes a computer program or computer program products comprising instructions for execution by a computer, the instructions comprising means for performing the above method.

The invention further proposes a computer-aided design system comprising graphical user interface and a processor coupled to a memory, the memory having recorded thereon the above computer program.

The invention further proposes a three-dimensional object routed along a path obtainable by the above method.

The invention further proposes a computer readable storage medium having recorded thereon the above computer program.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Embodiments of the invention will now be described, by way of non-limiting example, and in reference to the accompanying drawings, where.

DETAILED DESCRIPTION OF THE INVENTION

A description of example embodiments of the invention follows.

The teachings of all patents, published applications and references cited herein are incorporated by reference in their entirety.

Figure 26:
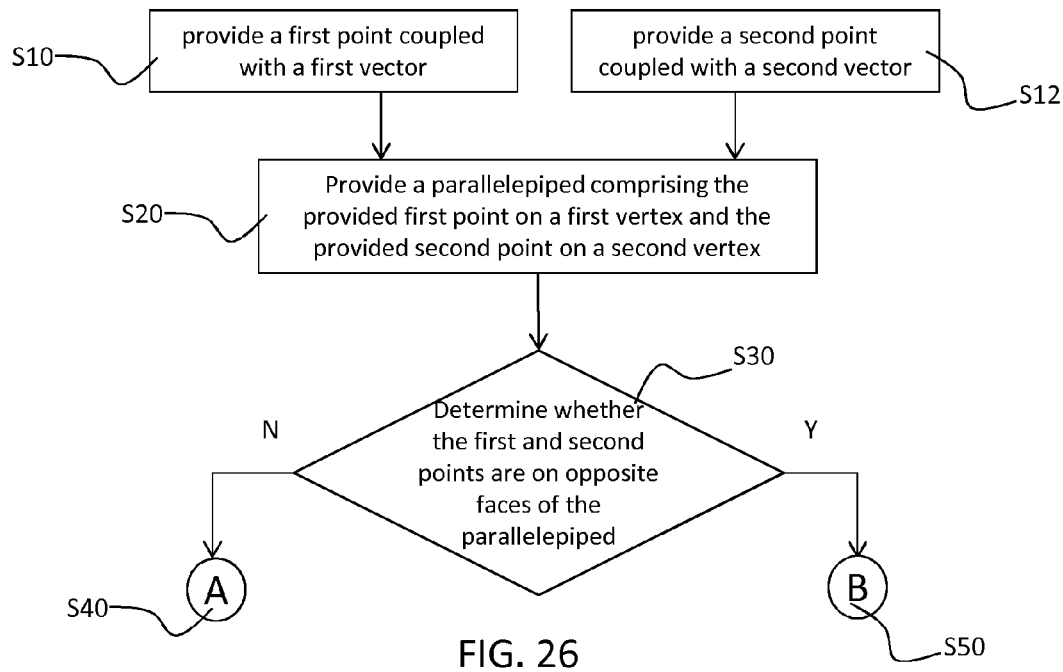
FIGS. 26-28 show flowcharts illustrating an example of the method of the invention.
Figure 27:
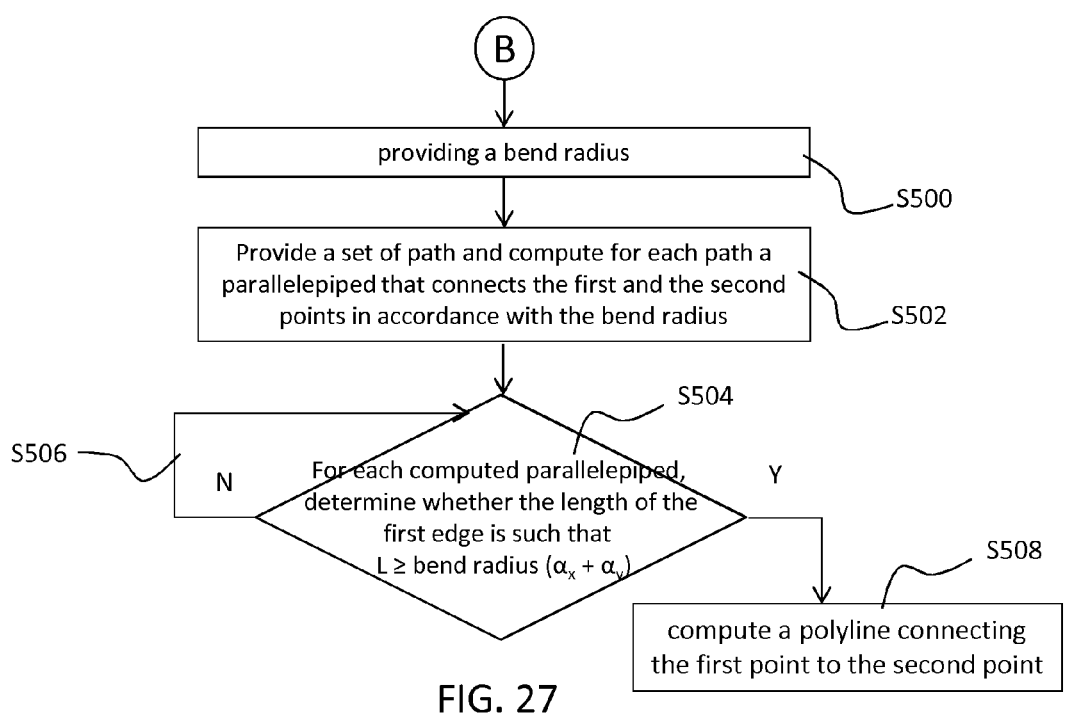
Figure 28:
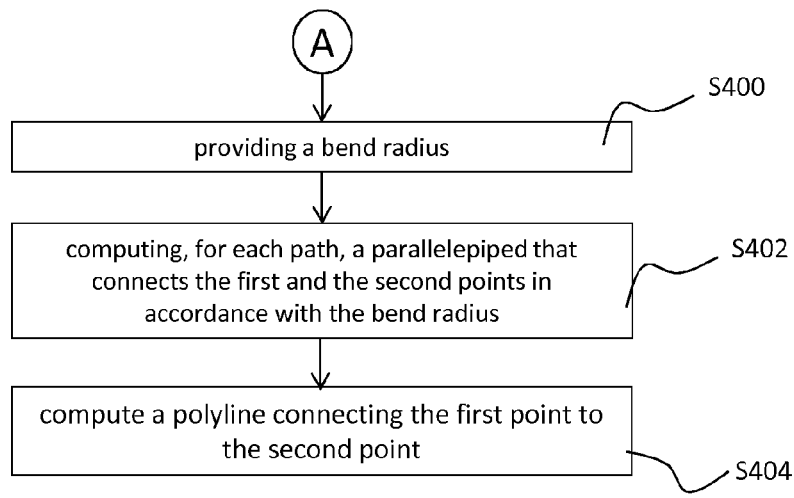

With reference to the flowcharts of FIGS. 26 to 28, it is proposed a computer-implemented method for designing a path connecting a first point to a second point in a three-dimensional scene. A path is a set of points connected by, but not limited to, straight line, arcs, curves . . . . A path may be represented by a polyline (also referred to as polygonal chain) that comprises a connected series of line segments. The set of points comprises at least two points, namely a first point and a second point. The first point may be also referred to as start point and the second point may be also referred to as end point. The method comprises providing a first point coupled with a first vector and providing the second point coupled with a second vector. A vector is a geometric object that has a magnitude (or length), a direction and an orientation. For instance, a vector is frequently represented by a line segment with a definite orientation, or graphically as an arrow, connecting an initial point A with a terminal point B. Hence, the first and second vectors provide an orientation in the 3D scene of the first and second points, respectively. The method further comprises providing a set of paths by following at the most three portions of a parallelepiped. Said otherwise, a set of routes joining the first and second points is provided. The parallelepiped comprises the first point of each path on one of its vertices, namely the first vertex, and the second point of each path on one of its vertices, namely the second vertex. It is to be understood that the first and second vertex are different; that is, the first and second points are not located on a same vertex of the parallelepiped. A portion of the parallelepiped means an edge, a diagonal of a face, a space diagonal.

Such a method highly improves the design of routes connecting two points for operations such as piping, tubing, HVAC, cabling, . . . , wherein the route followed by the modeled industrial products (e.g. pipes, tubes, air ducts, cables) need to respect physical rules and standards of the real world simulated in the 3D scene. First, the method improves ergonomics: indeed, the use of portions of a parallelepiped for tracing the paths allows to obtain easily all the possible path connecting two points, that is, all possible solutions can be proposed to the designer at one time. One understands that the designer can easily select the retained solution among all the possible solution. Furthermore, the use of a parallelepiped as a support of the paths provides an efficient way to simulate real world condition: indeed, the paths are traced for an engineering context (e.g. car engineering, aircraft engineering, ship engineering, electrical engineering . . . ) wherein the environment in which industrial products are routed is mainly comprised of planes (e.g. walls) connected each other with standard angles (e.g. 45°, 60°, 90°). For instance, electric cables in a building follow vertical path to provide electricity to each floors and follow horizontal paths to distribute electricity on each apartments of each floor. In addition, because the paths are obtained from portions of a parallelepiped, it is easier to provide to the designer solutions that are acceptable in the real world: for instance, it might be decided that a path following more than three edges are not accepted because it would involves a waste industrial products (e.g. pipes, tubes, air ducts, cables) to be routed along the path. Moreover, because the proposed solutions are solutions that are acceptable in the real world, less computer resources are used because useless solutions do not need to be computed. Furthermore, computing paths by using portions of a parallelepiped decreases the overall time for obtaining all the solutions because portions of the parallelepiped are shared between several solutions, and therefore one computation for one portion can be reused.

The method is computer-implemented. This means that the steps (or substantially all the steps) of the method are executed by at least one computer. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the steps of providing first and second points respectively coupled with first and second vectors may be performed upon user action, e.g. the designer may input the two points in the 3D scene using a haptic device such as a mouse and may provide values of each vector by orientating a graphical representation of a frame of reference wherein the vector is positioned (e.g. the origin of the frame of reference is the origin of the vector). The direction of the point may also be represented by a vector displayed on the 3D scene, and the user can act on the graphical representation of the vector in order to modify the direction of the point.

A typical example of computer-implementation of the method is to perform the method with a system comprising a graphical user interface (GUI) suitable for this purpose. The GUI is coupled with a memory and a processor. The memory, which stores a database, is merely any hardware suitable for such storage. Such a system improves the design of a path connecting a first point to a second point in a three-dimensional scene.

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the case of the method, the database may store three-dimensional modeled objects. A first three-dimensional modeled object may provide the first point coupled with the first vector and a second three-dimensional modeled object may provide a second point coupled with the second vector. The database may also store the first point coupled with a first vector and the second point coupled with a second vector.

The method generally manipulates modeled objects. A modeled object is any object defined by data stored in the database. By extension, the expression "modeled object" designates the data itself. According to the type of the system, the modeled objects may be defined by different kinds of data. The system may indeed be any combination of a CAD system, a CAE system, a CAM system, and/or a PLM system. In those different systems, modeled objects are defined by corresponding data. One may accordingly speak of CAD object, PLM object, CAE object, CAM object, CAD data, PLM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is meant any system suitable at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round etc.) and/or standard surfacing features (e.g. sweep, blend, loft, fill, deform, smoothing and/or etc.). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

CAM stands for Computer-Aided Manufacturing. By CAM solution, it is meant any solution, software of hardware, suitable for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

CAE stands for Computer-Aided Engineering. By CAE solution, it is meant any solution, software of hardware, suitable for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, suitable for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA™.

Figure 29:
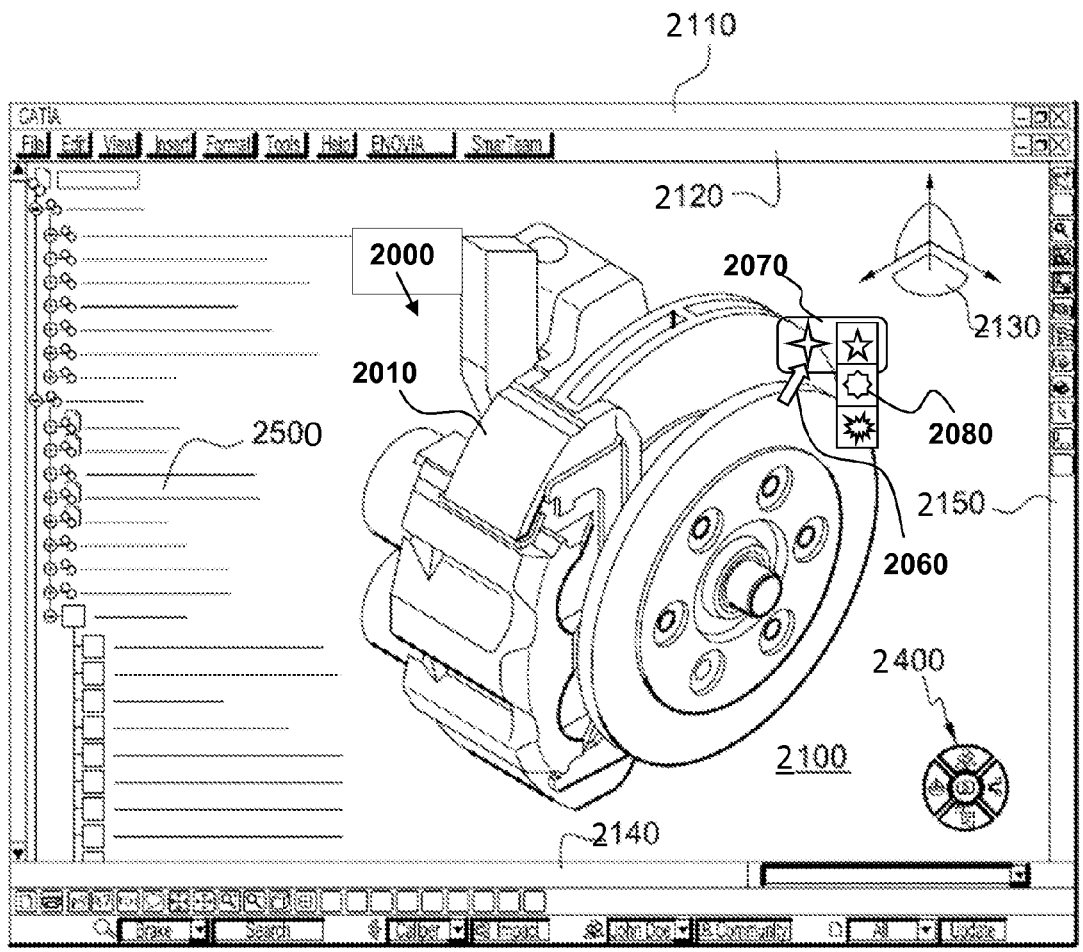
FIG. 29 shows an example of a graphical user interface of a CAD system.

FIG. 29 shows an example of the graphical user interface (GUI) of the system, wherein the system may be, but is not limited to, a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen.

The GUI may for example display data 2500 related to the displayed product 2000. In the example of FIG. 29, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 30:
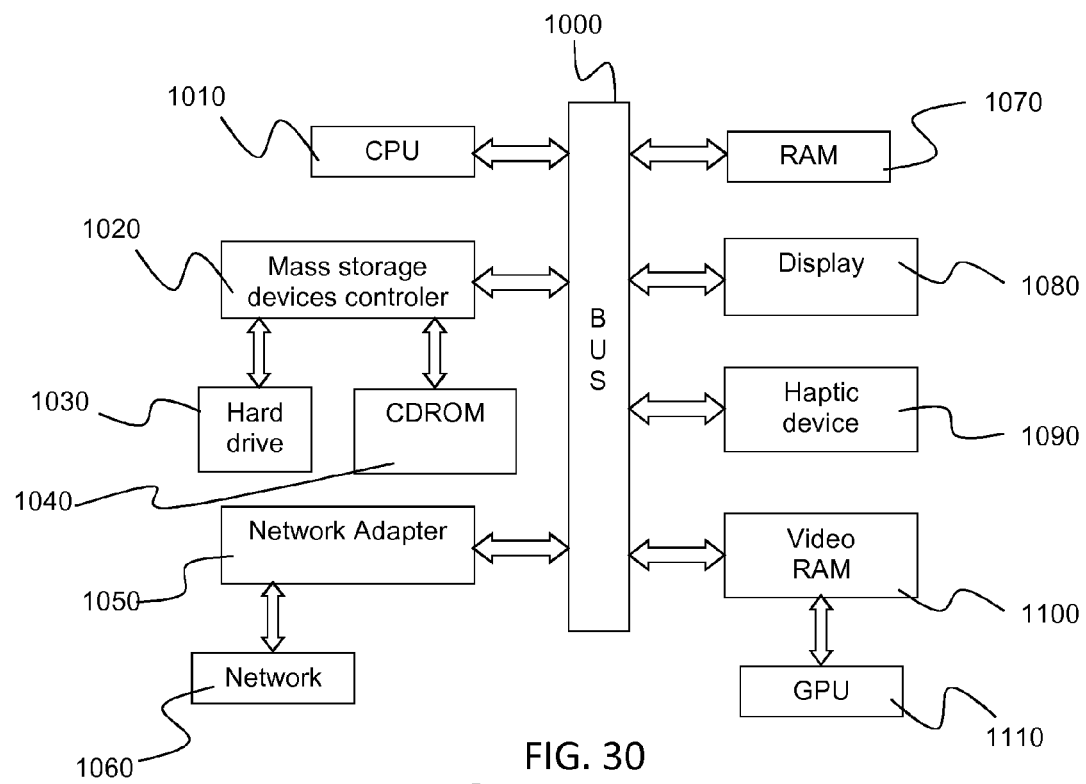
FIG. 30 shows an example of the structure of a CAD system.

FIG. 30 shows a computer system, e.g. a CAD system.

The computer system comprises a central processing unit (CPU) 1010 connected to an internal communication BUS 1000, a random access memory (RAM) 1070 also connected to the BUS. The computer system is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080, as mentioned with reference to FIG. 29. In addition, the cursor control device allows the user to select various commands, and input control signals. The cursor control device includes a number of signal generation devices for input control signals to system. Typically, a cursor control device may be a mouse, the button of the mouse being used to generate the signals. Signals may also be generated by touching the display, e.g. the display 1080 is a touch-sensitive display.

With reference to the flowcharts of FIGS. 26 to 28, it is discussed an example of the present invention.

At step S10, a first point coupled with a first vector is provided. The term point means an entity that has a location in 3D scene. A 3D scene is a 3D space in which spatial relationships between objects are described. In general, a 3D modeled object is represented in the 3D scene. The 3D scene may be a limited or an unlimited space. In practice, the 3D scene is limited due to computer resolution. The point is coupled with a first vector. The first vector provides a direction of the point in the 3D scene. In practice, the first vector is positioned in a frame of reference wherein the origin of the frame of reference is the origin of the vector and wherein the origin of the frame of reference is the first point. Said otherwise, the first vector comprises a set of dimensions ($x_1$, $y_1$, $z_1$) within a frame of reference (x, y, z). The origin of the frame, the origin of the vector, and the first point may have the same coordinates ($x_0$, $y_0$, $z_0$) in the 3D scene, being understood that the 3D scene is oriented. In practice, the frame of reference may have a graphical representation that may be displayed. The user can change one or more value of the first vector by acting on the frame of reference, as known in the art. The first vector may have a graphical representation in the 3D scene, and the user may act on this representation in order to modify the direction of the point. Providing the first point coupled with the first vector means that the system executing the method according to the invention can access data relative to the point and the vector; for instance, the data relative to the first point and vector are stored in memory of the system and accessible by the CPU (Computer processing Unit) coupled with the memory.

At step S12, a second point coupled with a second vector is provided. This step is similar to the step S10.

In practice, the steps S10 and S12 are respectively performed by placing a 3D modeled object in three-dimensional scene, wherein the 3D object is oriented in the three-dimensional scene by the vector, being understood that the point coupled with the vector is comprised in the 3D object. The point may be located, but not limited to, on the geometric center of the 3D object. One understands that the 3D object may be a 3D modeled object.

Next, at step S20, it is provided a parallelepiped. A parallelepiped is a three-dimensional figure formed by three pairs of parallelograms, any of the three pairs of parallel faces can be viewed as the base planes of prism. A parallelepiped has three sets of four parallel edges; the edges within each set are of equal length. A parallelepiped has eight vertices. A parallelepiped may be viewed as being a polyhedron with six faces, each of which is a parallelogram.

In practice, the parallelepiped may be a rectangular parallelepiped wherein the parallelograms are rectangles. A rectangular parallelepiped advantageously provides normal angles between edges of the parallelepiped, such normal angles being appropriate with regular shapes of industrial products in the real world.

The parallelepiped comprises the provided first point on a first vertex and the provided second point on a second vertex. It is to the understood that the first and second vertices are not the same, that is, they do not have the same location in the 3D scene.

The parallelepiped comprises a set of portions; a portion can be an edge, a diagonal of a face, a space diagonal. The diagonal of a face is the line connecting (or joining) two nonconsecutive vertices of a face of the parallelepiped, e.g. a parallelogram. A space diagonal is the line joining a corner of the parallelepiped to the opposite corner. A space diagonal is also referred to as triagonals or volume diagonals, as known in the art.

The parallelepiped may be oriented in the three-dimensional scene. This amounts to say that the parallelepiped may be positioned in the 3D scene about the first and second vertices: indeed, the axis passing through the first and second vertices may be contemplated as a rotation axis and thus the parallelepiped may have multiple positions in the 3D scene. The orientation of the parallelepiped thus allows fixing the parallelepiped in the 3D scene.

The orientation of the parallelepiped may be relative to the global orientation of the three-dimensional scene wherein the parallelepiped is imbedded. The global orientation of the 3D scene is generally performed about a main reference frame of the 3D scene. In practice, one of the three directions ($x_{scene}$, $y_{scene}$, $z_{scene}$) of the global orientation of the three-dimensional scene is determined as being oriented in accordance with the gravity. A standard practice is to choose the direction $z_{scene}$ to be normal to a virtual ground of the simulated world.

Said otherwise, the direction $z_{scene}$ is oriented according to the gravity of the simulated world. For instance, the parallelepiped may be oriented in the three-dimensional scene about one the one of the oriented direction of the global orientation, e.g. one edge of the parallelepiped has the same direction as the $z_{scene}$ axis of the global orientation.

The orientation of the parallelepiped may be relative to the directions of the first vector, as known in the art. For instance, the first vector coupled with the first point may be collinear with a vector having as direction an edge of the parallelepiped. As another example, the first vector may be collinear with a vector attached to the parallelepiped, e.g. a vector starting from one of the vertices of the parallelepiped.

The orientation relative to the direction of the second vector may be performed as for the first vector.

The orientation of the parallelepiped advantageously allows taking into account of the context wherein the paths are going to join the first and second points. Indeed, depending that the parallelepiped is oriented about the first vector, the second one, or the orientation of the 3D scene, some solutions of paths may be rejected, e.g. clash between paths and other objects of the 3D scene may appear depending on the orientation of the parallelepiped.

Figure 2:
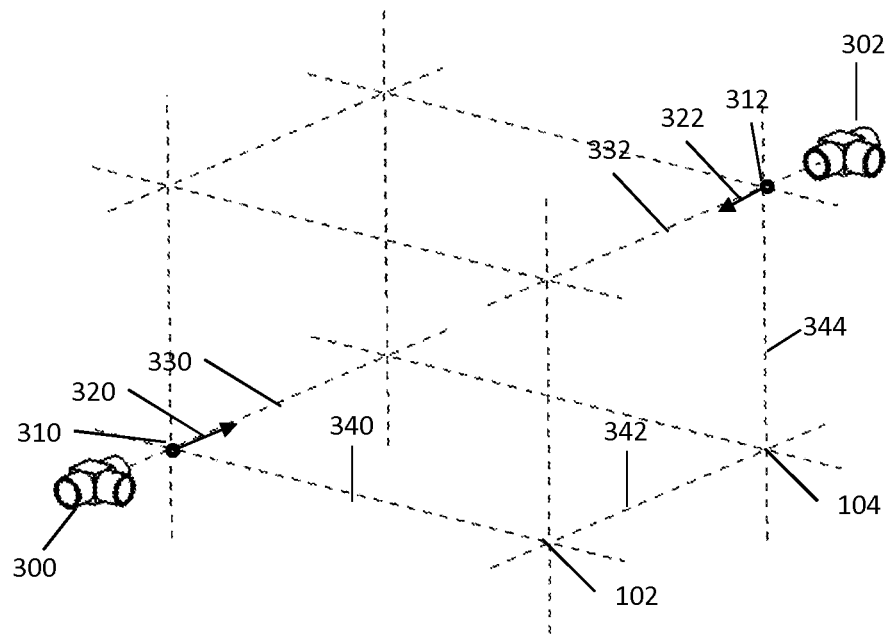
FIG. 2 shows an example of a parallelepiped.

Referring now to FIG. 2, it is shown an example of steps S10 to S20. Two 3D modeled objects 300, 302 are placed in a 3D scene. The first and second 3D modeled objects are T connector pipes. A T connector pipe has two outlets, at 90° to the connection to the main line. Here, the first 310 and second 312 points are not located on the 3D modeled object, but they are part however of the 3D modeled: they are placed on the axis of one of the pipes of the T connector pipe. Each one of the two objects 310, 312 is oriented in the 3D scene by the vector 320, 322 coupled with its respective point. In the example of FIG. 2, the vectors 320, 322 are respectively collinear with the edges 330, 332 and each T connector pipe has therefore the axis of an outlet aligned with an edge of the parallelepiped. The rectangular parallelepiped has been oriented in accordance with the direction $z_{scene}$ so that vertical edges (for instance 344) are collinear with the direction $z_{scene}$: the face of parallelepiped comprising the edges 330, 340, 342 is therefore parallel to the virtual ground of the simulated world. Hence, in this example, the vector 320 is collinear with the edge 330, but also with the direction $y_{scene}$, and the direction $x_{scene}$ is collinear with the edge 340. One understands that the main reference frame ($x_{scene}$, $y_{scene}$, $z_{scene}$) of the 3D scene in this example is an orthonormal frame of reference.

Back to the flowchart of FIG. 26, at step S30, it is determined whether the first and the second points respectively located on the first and second vertices are on opposite faces of the parallelepiped. Opposite faces means a pair of faces of the parallelepiped that do not have common vertices. This amounts to say that it is determined whether the first and the second points are on opposite vertices of the parallelepiped, wherein opposite vertices means that the 3 edges connected to the first vertex are not linked to the 3 edges connected to the second vertex. Depending on the result of step S30, two different set of paths connecting the first point to the second points can be provided to the user.

Figures 17, 18:
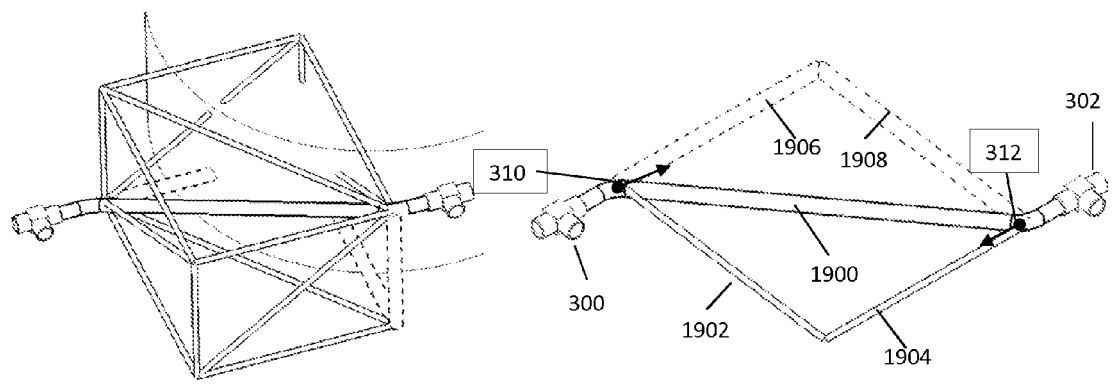
FIG. 17 shows an example of clash detection.
FIG. 18 shows an example wherein the set of paths are on a same face.

FIG. 18 illustrates an example of the present invention in the event the first and second points are not located on opposite faces of the parallelepiped, that is to say, the first and second vertices belong to a same face of the parallelepiped. In this case, it is provided a set of three paths wherein each path starts from the first point and ends at the second point (or inversely), and wherein the set of path comprises the following three paths:

(i) one path comprises one portion of the parallelepiped, the one portion being a diagonal of the face to which the first and second vertices belong to;

(ii) two paths comprise two consecutive portions of the parallelepiped, wherein each portion of the parallelepiped is an edge.

FIG. 18 illustrates the case wherein two 3D modeled objects representing T connector pipes have been placed on a same plane in the 3D scene. The 3D modeled objects 300, 302 are the same as in FIG. 2, excepted that the first 310 and second 312 points belong to a same face of the parallelepiped. In this figure, only the face common to the two points is represented. The path 1900 connecting the first point 310 and the second point 312 is made of the diagonal of the face to which the first and second points belong. One path comprises the two consecutive edges 1902, 1904, and another one comprises the two consecutive edges 1906, 1908.

Referring now to FIG. 28, at step S400, it is provided a bend radius. The bend radius, which is measured to the inside curvature, is the minimum radius one can bend a pipe, tube, sheet, cable or hose without kinking it, damaging it, or shortening its life, as known in the art. The minimum bend radius is the radius below which an object should not be bent. Providing the bend radius may be performed upon user action, e.g. the user enters the value of the bend radius. Alternatively, the bend radius may be automatically provided by the system performing the method, e.g. a default value is provided, and this default value may depends on the object that is intended to follow the path (for instance, pipe, electric cable, . . . ). Providing a bend radius means that a value of the bend radius is available to the system, e.g. stored in memory of the system and accessible by the CPU coupled with the memory.

Then, at step S402, it is computed, for each path of the set of paths, a parallelepiped that connects the first and the second points in accordance with the bend radius. The bend radius introduces geometrical constraints for connecting at least two portions of the path connecting the first and second points. In particular, the first and second points that are placed on the first and second vertices may not be oriented so that the provided bend radius of the path connecting to the first or second points can be respected: indeed, the path starting from the first point should have the same direction as the one of the vector coupled with the first point and the path arriving at the second point should have the same direction as the one of the vector coupled with the second point. Hence, depending on the orientation of the first and/or second points and the orientation of the parallelepiped, the bend radius may be or not respected.

In the event the provided bend radius cannot be respected on the portion starting from the first point or on the second point for a given path, a new parallelepiped is computed so that the bend radius can be applied. In practice, this may involve that the first vertex and the first point are no more located on the same location in the 3D scene, and that the second vertex and the second point are no more located on the same location in the 3D scene.

The computation for each path of a new parallelepiped may comprise the computation of a new position of the first vertex and a new position of the second vertex.

The new position of the first vertex is obtained by computing a distance $D_1$ between the first point and the first vertex that takes into account of (i) the direction of the first vector coupled with the first point and (ii) the direction of portion of the path that is connected to the first vertex, e.g. the first edge followed by the path. The distance $D_1$ is the distance between the first point and the first vertex, being understood that both the first point and the first vertex are located on the direction provided by the first vector coupled with the first point.

Optionally, a third vector may be provided to the portion of the path connected to the first vertex in order to make easier the determination of the angle $\alpha_1$. The direction of this third vector is the portion of the path connected to the first vertex, and the third vector may be oriented in accordance with the direction of the path (e.g. from the first point to the second one).

The distance $D_1$ is defined by the relation $D_1$=Bend Radius×(sin $\alpha_1$) wherein Bend Radius is the value of the provided bend radius at step S400, and $\alpha_1$ is the value of the angle between the first vector and a direction of a portion of the path that is connected to the first vertex. $D_1$ is thus the product between Bend Radius and (sin $\alpha_1$).

Similarly, the new position of the second vertex is obtained by computing a distance $D_2$ between the second point and the second vertex that takes into account of (i) the direction of the second vector coupled with the second point and (ii) the direction of portion of the path that is connected to the second vertex, e.g. the last edge followed by the path. The distance $D_2$ is the distance between the second point and the second vertex, being understood that both the second point and the second vertex are located on the direction provided by the second vector coupled with the second point.

The distance $D_2$ is similarly defined by the relation $D_2$=Bend Radius×(sin $\alpha_2$), wherein Bend Radius is the value of the provided bend radius at step S400, and $\alpha_2$ is the value of the angle between the second vector and a direction of a portion of the path that is connected to the first vertex. $D_2$ is thus the product between Bend Radius and sin $\alpha_2$. In practice, the value of the Bend Radius and $\alpha_2$ may be in degree.

As for the angle $\alpha_1$, a vector (for instance a fourth vector) may be optionally provided to the portion of the path connected to the second vertex in order to make easier the determination of the angle $\alpha_2$. The direction of this fourth vector is the portion of the path connected to the second vertex, and it may be oriented in accordance with the following direction of the path (e.g. from the second point to the first one).

It is to be understood that the orientation of the parallelepiped is the same as for the computing the distance $D_1$, that is, the orientation of the parallelepiped is kept unchanged during the computation of distances $D_1$ and $D_2$.

Practically, the third and fourth vectors (that may be provided to the portion of the path connected to the first or second vertex) can be obtained using three main directions of the parallelepiped, namely Dir.A, Dir.B, Dir.C.

The Dir.A depends on the orientation of the parallelepiped in the 3D scene, as previously discussed. This means that the Dir.A may be one of the following:

(i) the direction of the first vector coupled with the first point in the event the parallelepiped has been oriented about the first vector;

(ii) the direction of the second vector coupled with the second point in the event the parallelepiped has been oriented about the second vector;

(iii) one of the directions ($x_{scene}$, $y_{scene}$, $z_{scene}$) of the global orientation of the scene selected arbitrarily.

The Dir.B is the direction selected as being normal to a virtual ground of the simulated world. The standard practice is to choose the direction $z_{scene}$ that is oriented according to the gravity of the simulated world. It is to be understood that in the event that the main direction Dir.A is the direction $z_{scene}$ (case (iii)), then another direction of the global orientation may be selected as main direction Dir.B.

The Dir.C is obtained by computing the vector product (or cross product) between the vectors representing Dir.A and Dir.B.

Hence, it results that each edge of a rectangular parallelepiped (previously oriented) is collinear to one of the three main directions Dir.A, Dir.B, and Dir.C.

Once the new position of the first and second vertices is known, it then possible to deduce the position of the six remaining vertices of the parallelepiped.

Figure 31:
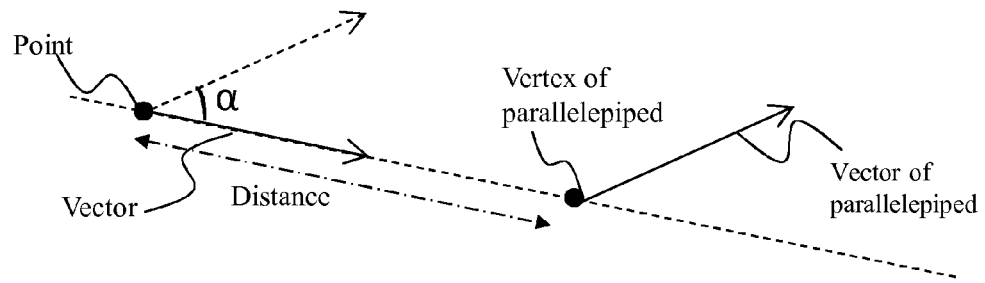
FIG. 31 shows an example of the computing of a new parallelepiped for each path.

Referring to FIG. 31, it is shown that the distance D between a point and a vertex on which the point was located. The distance is measured along the direction of the vector coupled with the point, and this direction comprises both the point and the vertex. The distance is typically an Euclidian distance. The vertex, on which the point was initially located, is coupled with a vector that represents the direction of the portion of the parallelepiped that belongs to the path for which the new parallelepiped is computed. The angle α is between the vector and a direction of the portion that is represented by a vector (represented in dotted line on FIG. 31).

Next, at step S404, a polyline connecting the first point and the second point is computed, as it will be explained below in reference to FIGS. 1, 2, and 3.

Figure 4:
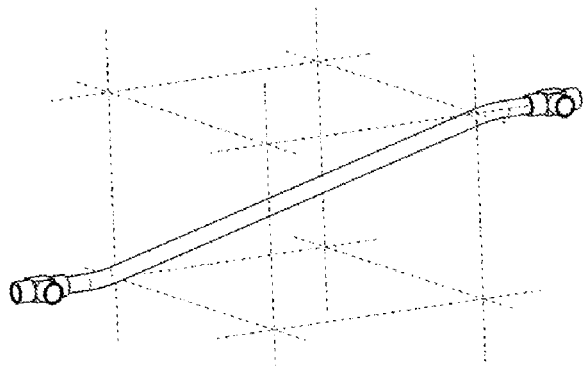
FIGS. 4 to 16 show examples of paths.

FIGS. 5 to 17 illustrate examples of paths of the set of paths that are retained as possible solutions in the event the first point (on the left) and second points (on the right) are located on opposite faces of the parallelepiped, that is to say, the first and second vertices do not belong to a same face of the parallelepiped. In this case, it is provided a set of paths wherein each path starts from the first point and ends at the second point (or inversely), and wherein the set of path comprises the following thirteen paths:

(i) one path comprising one portion made of the central diagonal connecting the first and second points, as illustrated on FIG. 4;

(ii) six paths wherein each path comprises three consecutive portions, wherein each portion is an edge. These six paths are illustrated on FIGS. 5 to 10;

(iii) three paths wherein each path is comprised of two portions having a common vertex of the parallelepiped, wherein:
  one portion is a diagonal of a face of the parallelepiped, the diagonal comprising the first point; and
  one portion is an edge that comprises the second point.
These three paths are illustrated on FIGS. 12, 14, and 16.

(iv) three paths wherein each path is comprised two portions having a common vertex of the parallelepiped, wherein:
  one portion of the parallelepiped is a diagonal of a face of the parallelepiped, the diagonal comprising the second point; and
  one portion of the parallelepiped is an edge that comprises the first point.
These three paths are illustrated on FIGS. 11, 13, and 15.

Referring now to FIG. 27, at step S500, it is provided a bend radius. This step is similar as the step S400.

Next, at step S502, it is computed, for each one of the thirteen paths, a parallelepiped that connects the first and second points in accordance with the bend radius. This step is similar as the step S402.

Then, at step S504, it is determined, for each computed parallelepiped of step S502, whether the length L of each edge of the path is such that $$L \geq \text{Bend Radius} \times (\sin \alpha_x + \sin \alpha_y) \text{ wherein:}$$

Bend Radius is the value of the provided bend radius at step S500;

$\alpha_x \propto_x$ is the value of the angle between the edge (for which L is measured) of the path and another portion of the path that share a first common vertex of the edge. Alternatively, $\alpha_x \propto_x$ can be the value of the angle between the edge and the direction of the first vector; in this case, the angle $\alpha_x$ is the angle of the first bend of the path that is met when following the path from the first to the second point.

$\alpha_y \alpha_y$ is the value of the angle between the edge (for which L is measured) and another portion of the path that that share a second common vertex of the edge. Alternatively $\propto_y$ can be the value of the angle between the edge and the direction of the second vector; in this case, the angle $\alpha_y$ is the angle of the last bend of the path that is met when following the path from the first to the second point, or inversely the angle $\alpha_y$ is the angle of the first bend of the path that is met when following the path from the second to the first point. In practice, the value of the Bend Radius, $\alpha_x$ and $\propto_y$ may be in degree.

When the angle $\alpha_x$ (or $\propto_y$) is the angle between two portions of the parallelepiped that are joined together to one the two vertices of the edge, the angle $\alpha_x$ (or $\propto_y$) is typically 90°, e.g. for a rectangular parallelepiped.

When the angle $\alpha_x$ (or $\propto_y$) is the angle between the edge and the direction of the first (or second) point, the angle $\alpha_x$ (or $\propto_y$) can have any value. In this case, the angle $\alpha_x$ (or $\propto_y$) may be contemplated as being the angle between the first (or second) vector coupled with the first (or second) point and the third vector optionally provided, as seen previously.

In the event the length of an edge of a path is less than the computed length value L, the path is not kept, that is, the path is not a proposed solution. Indeed, the length L advantageously allows to verify that the edges of a path are length enough for allowing the correct bend radius between two portions of the path or between the first point and a portion or between the second point and a portion.

Figure 20:
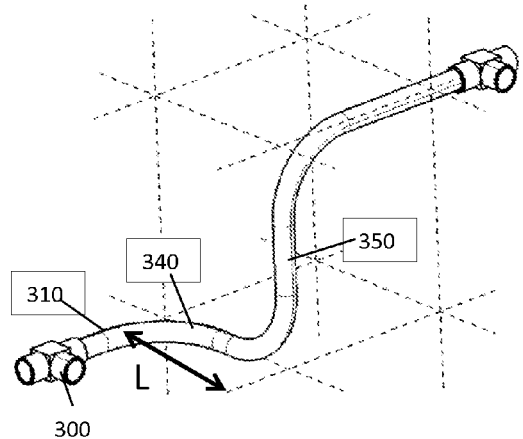
FIG. 20 illustrates the case wherein one or more paths of the set of path are removed.

Referring now to FIG. 20, it is shown an example of a parallelepiped wherein the length L of an edge is too short for allowing a correct bending of the path between the first point 310 of the object 300 and the portion of the path on the edge 340 on a one hand, and for allowing a correct bending of the portion of the path between the edge 340 and the portion of the path on the other edge 350 on another hand. Consequently, all the paths comprising the portion of the path following the edge 340 are not kept as a possible solution.

Next, at step S508, a polyline connecting the first point to the second point is computed. The computing of the polyline is performed as known in the art.

Figure 1:
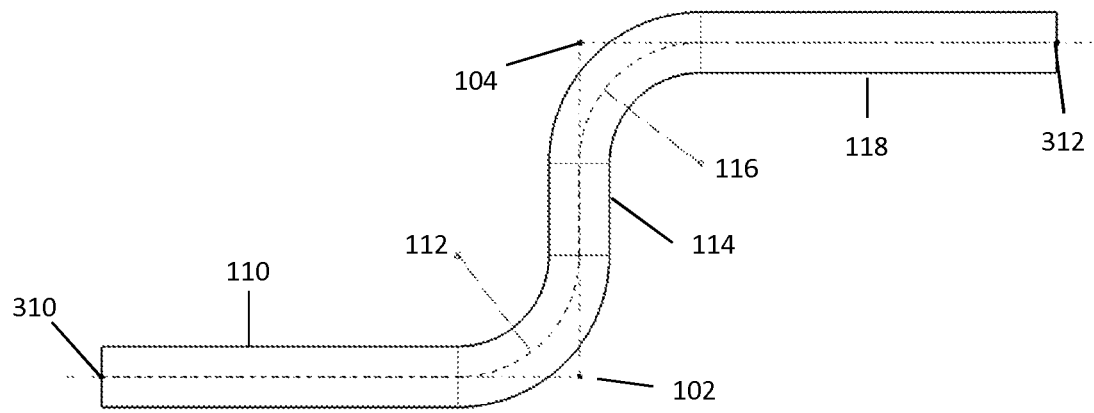
FIG. 1 shows an example of a polyline that follows a route.
Figure 5:
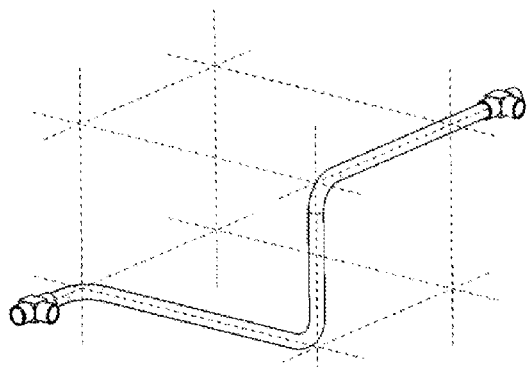
Figure 6:
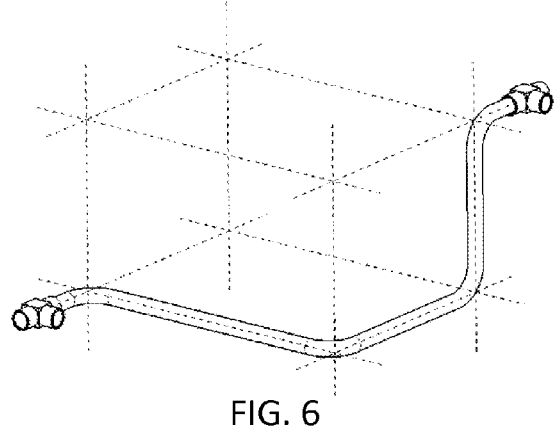
Figure 7:
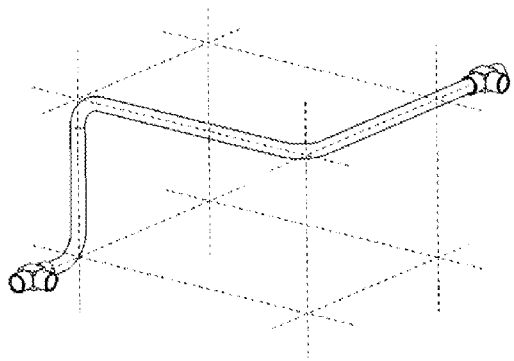
Figure 8:
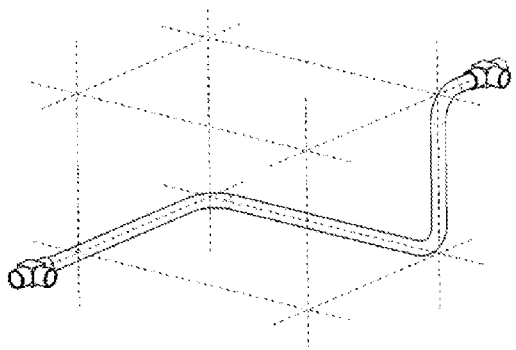
Figure 9:
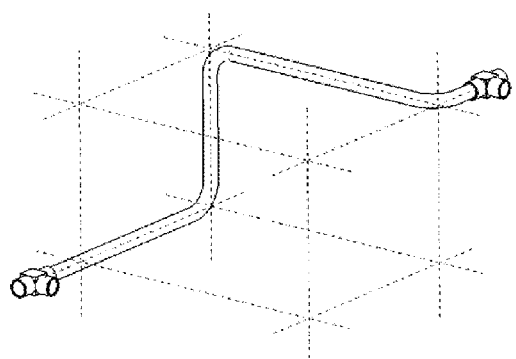
Figure 10:
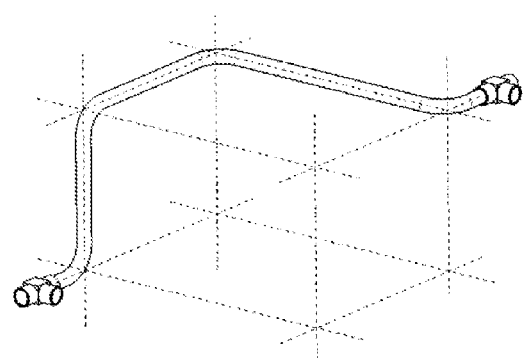
Figure 11:
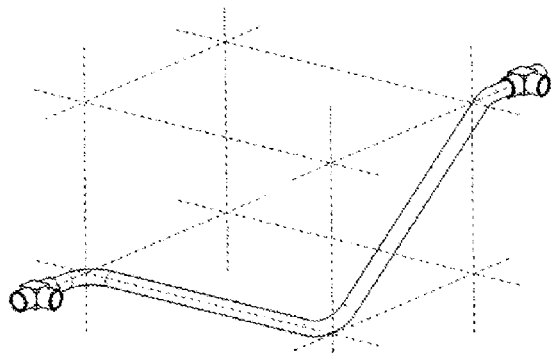
Figure 12:
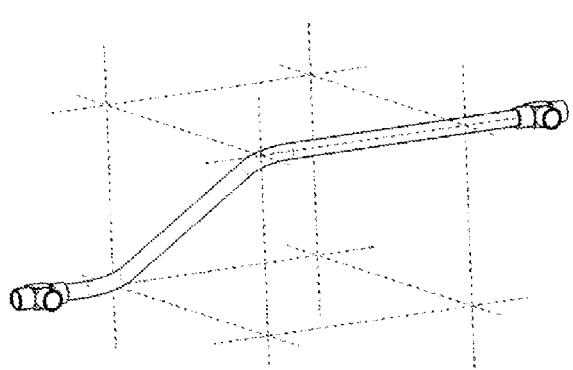
Figure 13:
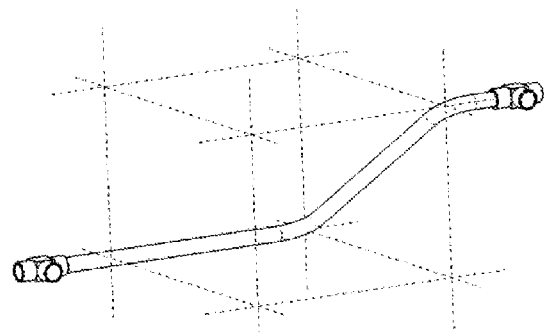
Figure 14:
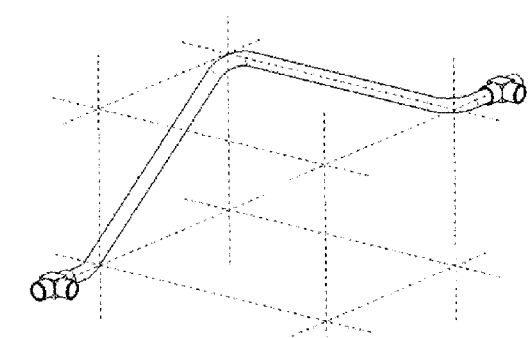
Figure 15:
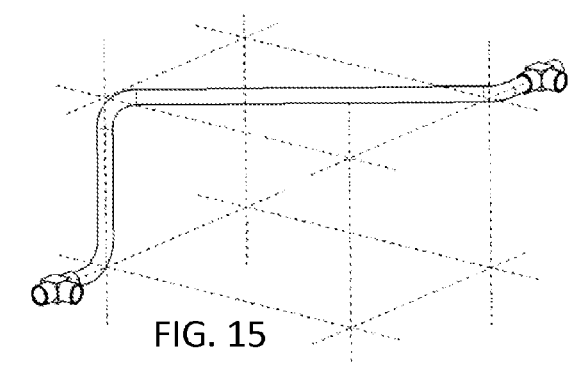
Figure 16:
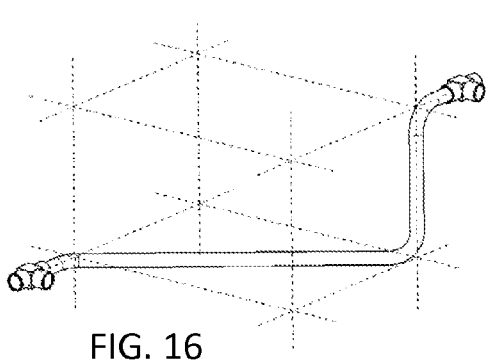

Referring now to FIG. 1, it is shown an example of a computed polyline of the path of the solution represented on FIG. 5 wherein the path is comprised of three consecutive edges of the parallelepiped. FIG. 1 is shows a path provided by the present invention for the example of FIG. 2.

The polyline depicted on FIG. 1 comprises a first portion 110 joining vertices 310 and 102 of the edge 340, a second portion 114 joining vertices 102 and 104 of the edge 342, and a third portion 118 joining vertices 104 and 312 of the portion 344 of the parallelepiped. The consecutive portions 110, 114, 118 of the parallelepiped are connected each other with a curve line whose value is fixed by the provided bend radius. One understands that the expression the consecutive portions 110, 114, 118 of the parallelepiped are connected each other means that the portion 110 is joined to the portion 114 via the common vertex 102 and that the portion 114 is joined to the portion 118 via the common vertex 104. Hence, the polyline comprises straight parts 110, 114, and 1189, and curved parts 112 and 114 that connect the consecutive straight parts.

Figure 3:
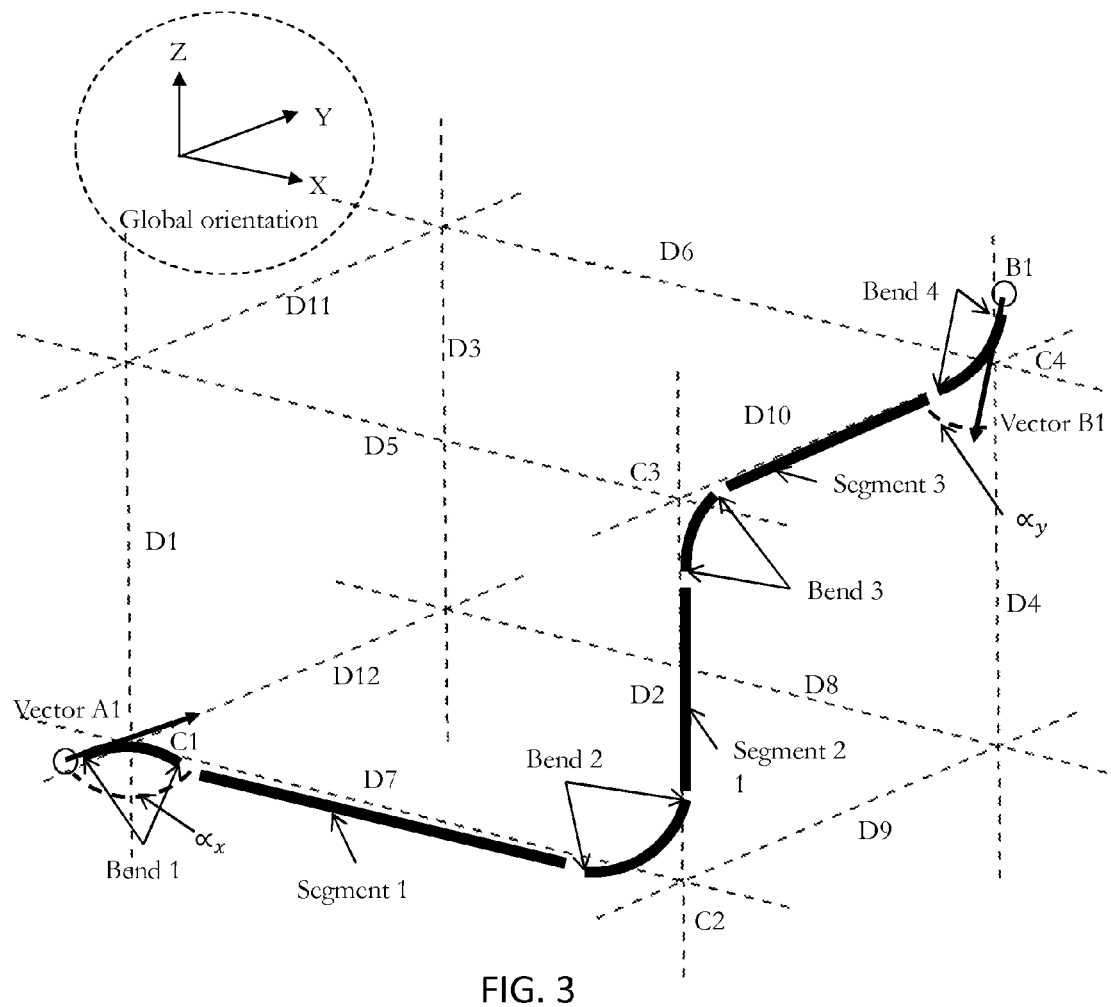
FIG. 3 illustrates an example of a path.

Referring now to FIG. 3, it is discussed an example wherein the parallelepiped has been recomputed in accordance with the bend radius. The provided points A1 and B1 are coupled with a vector and are no more placed on vertices of the parallelepiped because the parallelepiped has been recomputed so that the provided bend radius on bend1 and bend 4 can be respected. The path displayed comprises the edges D7, D2, and D10 of the parallelepiped. These three consecutive portions Segment1, Segment2, Segment3 are connected each other with curve lines Bend2, Bend3, and the point A1 is joined to the Segment1 with curve line Bend 1 and the point A2 is joined to the Segment3 with curve line Bend4.

Interestingly, the vector A1 coupled with the start point A1 is collinear with one vector (not represented) of the edge D12, and the angle $\alpha_x$ between the edge D7 and the vector A1 is 90°, being understood that the parallelepiped is a rectangular parallelepiped. On the contrary, the vector A2 coupled with the end point A2 form an angle $\alpha_y$ with the edge D10 that is different of 90° because vector A2 is not collinear with any vector (not represented) of edges D4, D6, D10. In particular, the angle $\alpha_z$ between the direction of vector B1 and the edge D10 that is taken by the path for which the new parallelepiped is computed is different of 90°. Interestingly, the direction of vector A1 comprises the point A1 and vertex C 1 and the direction of vector B1 comprises the point B1 and the vertex C4.

The step S404 is similar to the step S508.

In practice, once the polyline has been computed for each path of the set of path, a shape may be formed along the computed polyline. The polyline is the center of section of the shape. The dimension of the section of an industrial product is typically provided upon user action, being understood that a default dimension of the section may be provided by the system performing the present invention. An industrial product is a product that is intended to be used in the industry, or at least involved in an industrial process. For instance, pipes, electric cables, air ducts, trays, . . . are industrial products. The industrial products are typically modeled with a regular shape that extends along a line (e.g. the computed polyline). The section of the shape may be, but is not limited to, a circle, a square, a rectangle, an oval, a flat oval, . . . .

Referring now to FIG. 17, it is shown an example wherein paths of the set of paths are not presented as solutions to the designer because a clash analysis has occurred. In FIG. 17, it is shown a curved surface that several portions of the parallelepiped. Each path comprising one or more of the intersected portions of the parallelepiped is discarded of the set of paths presented to the designer. It is to be understood that the clash analysis is facilitated because the computations are performed on portions of the parallelepiped, and not on the paths themselves.

Alternatively, the analysis may be directly performed by the designer that can see the clash between one or more paths proposed as solution. Indeed, as the representations of all the solutions are realistic according to the present method, the designer can see the clashes with other objects of the scene and thus not select a bas solution.

Figure 19:
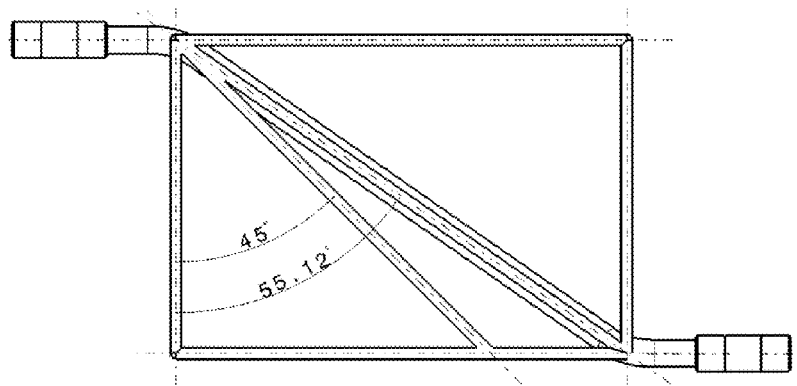
FIG. 19 shows an example of several angles of a diagonal portion of a path.

Referring now to FIG. 19, it is shown an example of the present invention wherein a diagonal portion of a face is modified so that the angle comprised between the edge from which starts the diagonal and the diagonal has a predetermined value. The edge from which starts the diagonal is defined as being the edge of a face that comprises the first vertex of the face that is traversed when following the path from the first point to the second one. Hence, the diagonal does not connect anymore two opposite points of a face, but it connects the first vertex of the face with a new point located on the edge joining the edge of the face that comprises the first vertex. In practice, this predetermined value of the angle is selected so that it is a standard value with regard to the industrial product following the path. For instance, if the path is intended to route pipes, the standard angle in the technical field of pipes are 45°, 60°, 90°. More generally, the predetermined value may be 45°, 60°, 90°.

For instance, on FIG. 19, the initial angle between of the diagonal portion of the represented face is 55.12°, which is not a standard value. Once the diagonal portion of a face has been modified, the new angle has a standard value of 45°.

One understands that the path with the modified diagonal comprises a new portion that joins the new point located with the former vertex joined by the diagonal.

Referring now to FIGS. 21 to 25, several examples of displays of solutions are represented. The solutions is the set of path obtained as the result of the present invention.

Figure 21:
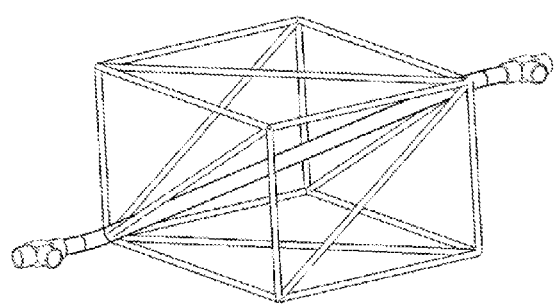
FIGS. 21-25 show examples of displays of solutions.

In FIG. 21, all the solutions (that is all the paths of the set of path) are shown.

Figure 22:
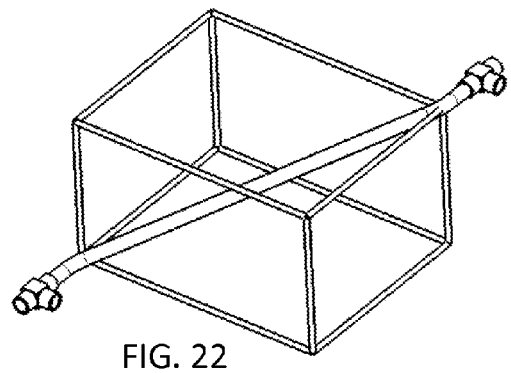

In FIG. 22, only paths on edges are shown. In addition, a default solution is also shown, here the path having as portion the space diagonal of the parallelepiped.

Figure 23:
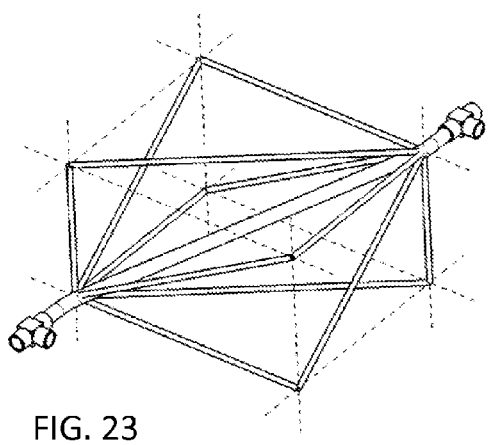

In FIG. 23, the paths on faces (diagonal) are shown, together with a default solution that is here the path having as portion the space diagonal of the parallelepiped.

Figure 24:
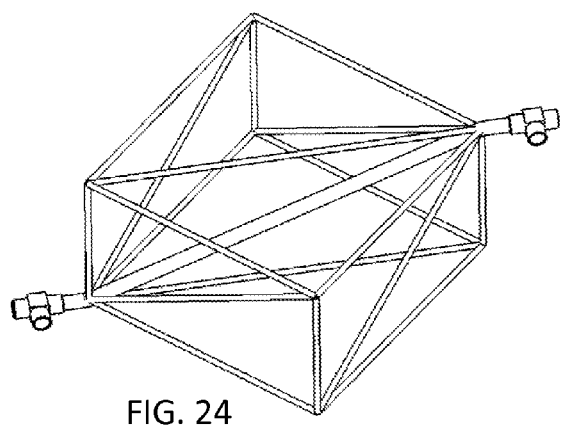

In FIG. 24, the displayed set of solutions is oriented according to the axis of view. The axis system that orients the parallelepiped is not linked to the provided first and second points coupled with the first and second vector.

Figure 25:
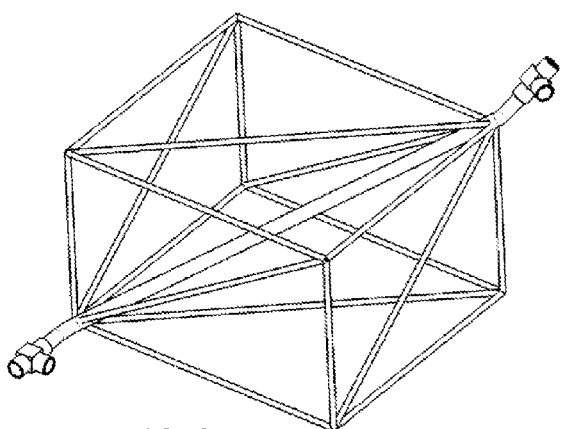

In FIG. 25, the parallelepiped follows one of the axis of the view, that is, of the global orientation of the 3D scene, and the direction of the first point. The third axis is computed from the two previous one to keep orthogonal axis system. Alternatively, the parallelepiped follows one of the axis of the view and the direction of the second point. The third axis is computed from the two previous one to keep orthogonal axis system.

The design method is for designing a path connecting a first point to a second point in a three-dimensional scene. "Designing a path" designates any action or series of actions which is at least part of a process of elaborating a path.

A computer program may comprise instructions by a computer, the instructions comprising means for causing the above system to perform the above method. The invention may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for designing a path connecting a first point to a second point in a three-dimensional scene in a computer-aided design (CAD) system, comprising:
   providing, by user input to the CAD system, the first point of the three-dimensional scene coupled with a first vector;
   providing, by user input to the CAD system, the second point of the three-dimensional scene coupled with a second vector; and
   providing a set of paths, at least two of the set of paths simultaneously shown on a display by the CAD system, the set of paths provided by following at the most three portions of a parallelepiped, the parallelepiped comprising the provided first point on a first vertex and the provided second point on a second vertex, a portion of the parallelepiped being an edge, a diagonal of a face, a space diagonal.

2. The computer-implemented method of claim 1, wherein the first and second vertices are on opposite faces of the parallelepiped, the set of paths comprises:
   one path comprising one portion made of the space diagonal connecting the first and second points;
   six paths comprising two portions having a common vertex of the parallelepiped, one portion being a diagonal of a face of the parallelepiped, the diagonal comprising the first or the second points, and one portion being an edge; and
   six paths comprising three consecutive portions, each portion being an edge.

3. The computer-implemented method of claim 1, wherein the first and second vertices belong to a same face of the parallelepiped, the set of path comprises:
   one path comprising one portion being a diagonal of the face the first and second vertices belong to; and
   two paths comprising two consecutive portions, each portion being an edge.

4. The computer-implemented method of claim 1, further comprising orienting the parallelepiped in the three-dimensional scene about one of the following orientation:
   one of the directions of the global orientation of the three-dimensional scene;
   a direction provided by the first vector; and
   a direction provided by the second vector.

5. The computer-implemented method of claim 1, further comprising providing a bend radius for connecting at least two portions of the path connecting the first and second points.

6. The computer-implemented method of claim 5, further comprising, after providing a bend radius:
   computing, for each path of the set, a parallelepiped that connects the first and the second points to the path in accordance with the bend radius.

7. The computer-implemented method of claim 6, wherein computing for each path of the set a parallelepiped comprises computing a new position of the first vertex and a new position of the second vertex by:
   computing a distance $D_1$ between the first point and the first vertex such that $D_1 = \text{Bend Radius} \times (\sin \alpha_1)$, wherein Bend Radius is the value of the provided bend radius, and $\alpha_1$ is the angle between the direction of the first vector and the portion of the path that is connected the first vertex; and
   computing a distance $D_2$ between the second point and the second vertex such that $D_2 = \text{Bend Radius} \times (\sin \alpha_2)$, wherein Bend Radius is the value of the provided bend radius, and $\alpha_2$ is the angle between the second vector and the portion of the path that is connected the second vertex.

8. The computer-implemented method of claim 6, further comprising:
   computing the length (L) of each edge of the path; and
   determining that the length (L) is such that $L > \text{Bend Radius} \times (\sin \alpha_x + \sin \alpha_y)$ wherein Bend Radius is the value of the provided bend radius, $\alpha_x$ is the value of the angle between the said each edge of the path and another portion of the path that share a first common vertex of the said each edge of the path or the value of the angle between the said each edge of the path and the direction of the first vector, and $\alpha_y$ is the value of the angle between the said each edge of the path and another portion of the path that share a second common vertex of said each edge of the path or the angle between the said each edge of the path and the direction of the second vector.

9. The computer-implemented method of claim 1, wherein the one or more portions of the parallelepiped form a polyline connecting the first point to the second point.

10. The computer-implemented method of claim 9, further comprising:
    providing the dimension of a section of an industrial product; and
    forming a shape along the polyline, wherein the polyline is the center of the section.

11. The computer-implemented method of claim 1, wherein:
    providing the first point coupled with the first vector comprises placing a first three-dimensional object in the three-dimensional scene, the first vector orienting the three-dimensional object in the three-dimensional scene; and
    providing the second point coupled with the second vector comprises placing a second three-dimensional object in the three-dimensional scene, the second vector orienting the three-dimensional object in the three-dimensional scene.

12. The computer-implemented method of claim 1, further comprising:
    displaying a preview of each paths of the provided set of paths; and
    emphasizing one of the previews to show the path connecting the first point to the second point.

13. A non-transitory computer program product comprising:
    a computer readable medium embodying a computer program for designing a path connecting a first point to a second point in a three-dimensional scene in a computer-aided design (CAD) system;
    instructions stored on the computer readable medium for execution of a design of said path connecting the first point to the second point in the three-dimensional scene by a computer, the instructions comprising means for:
    providing, by user input to the CAD system, the first point of the three-dimensional scene coupled with a first vector;

providing, by user input to the CAD system, the second point of the three-dimensional scene coupled with a second vector; and providing a set of paths, at least two of the set of paths simultaneously shown on a display by the CAD system, the set of paths provided by following at the most three portions of a parallelepiped, the parallelepiped comprising the provided first point on a first vertex and the provided second point on a second vertex, a portion of the parallelepiped being an edge, a diagonal of a face, a space diagonal.

14. A computer-aided design system (CAD) comprising:
a graphical user interface coupled to a computer memory; and
a processor coupled to the memory, the memory having recorded thereon a computer program designing a path connecting a first point to a second point in a three-dimensional scene, by the processor:
providing, by user input to the CAD system, the first point of the three-dimensional scene coupled with a first vector;
providing, by user input to the CAD system, the second point of the three-dimensional scene coupled with a second vector; and
providing a set of paths, at least two of the set of paths simultaneously shown on a display by the CAD system, the set of paths provided by following at the most three portions of a parallelepiped, the parallelepiped comprising the provided first point on a first vertex and the provided second point on a second vertex, a portion of the parallelepiped being an edge, a diagonal of a face, a space diagonal.

15. A computer-aided design system as claimed in claim 14 wherein the first and second vertices are on opposite faces of the parallelepiped, the set of paths comprises:
one path comprising one portion made of the space diagonal connecting the first and second points;
six paths comprising two portions having a common vertex of the parallelepiped, one portion being a diagonal of a face of the parallelepiped, the diagonal comprising the first or the second points, and one portion being an edge; and
six paths comprising three consecutive portions, each portion being an edge.

16. A computer-aided design system as claimed in claim 14 wherein the first and second vertices belong to a same face of the parallelepiped, the set of path comprises:
one path comprising one portion being a diagonal of the face the first and second vertices belong to; and
two paths comprising two consecutive portions, each portion being an edge.

17. A computer-aided design system as claimed in claim 14 further comprising the processor orienting the parallelepiped in the three-dimensional scene about one of the following orientation:
one of the directions of the global orientation of the three-dimensional scene;
a direction provided by the first vector; and
a direction provided by the second vector.

18. A computer-aided design system as claimed in claim 14 further comprising the processor providing a bend radius for connecting at least two portions of the path connecting the first and second points.

19. A computer-aided design system as claimed in claim 18 further comprising the processor, after providing a bend radius:
computing, for each path of the set, a parallelepiped that connects the first and the second points to the path in accordance with the bend radius.

20. A computer-aided design system as claimed in claim 14, wherein the processor is further configured to route a three-dimensional object of the CAD system along at least one of the set of paths.

* * * * *

UNITED STATES PATENT AND TRADEMARK OFFICE
CERTIFICATE OF CORRECTION

PATENT NO. : 9,330,498 B2
APPLICATION NO. : 14/336771
DATED : May 3, 2016
INVENTOR(S) : Guillaume Lerey Page 1 of 1

It is certified that error appears in the above-identified patent and that said Letters Patent is hereby corrected as shown below:

Title page, item (54) and in the Specification, column 1 in the Title please delete
"PATH CONNECTING A FIRST POINT TO A SECOND POINT IN A THREE-DIMENSIONAL SCENE" and insert
-- DESIGN OF A PATH CONNECTING A FIRST POINT TO A SECOND POINT IN A THREE-DIMENSIONAL SCENE --.

Signed and Sealed this
Nineteenth Day of July, 2016

Michelle K. Lee
*Director of the United States Patent and Trademark Office*